United States Patent [19]

Mann

[11] 3,870,550

[45] Mar. 11, 1975

[54] METHOD OF PREVENTING INGESTION OF LEAD BASE PAINT COATINGS

[75] Inventor: Seymour Mann, New York, N.Y.

[73] Assignee: Aceto Chemical Co., Inc., Flushing, N.Y.

[22] Filed: Nov. 20, 1973

[21] Appl. No.: 417,623

Related U.S. Application Data

[63] Continuation-in-part of Ser. No. 220,410, Jan. 24, 1972, abandoned, which is a continuation-in-part of Ser. No. 112,041, Feb. 2, 1971, abandoned.

[52] U.S. Cl.................... 117/84, 106/102, 106/287, 117/165, 424/180, 424/311
[51] Int. Cl.......................... C08b 25/00, B44d 1/12
[58] Field of Search ............... 106/287, 162; 117/73

[56] References Cited
UNITED STATES PATENTS
3,663,253   5/1972   Stone................................ 106/204

OTHER PUBLICATIONS

Cosmetic Dermatology, 1937, p. 442, 443.

Cosmetic Formulary, H. Bennet, 1937, p. 226.

Condensed, Chem. Dict., 6th Ed., p. 1,086, Sucrose Octa Acetate.

Primary Examiner—Theodore Morris
Attorney, Agent, or Firm—Steinberg and Blake

[57] ABSTRACT

A special solution or emulsion of sucrose octa-acetate is applied to surfaces which have been painted with lead base paint to effect bonding of the sucrose octa-acetate to the surface. The sucrose octa-acetate remains after the solvent evaporates to render the surface so bitter in taste that children will not eat a sufficient amount of any chipping lead base paint to be harmed thereby.

9 Claims, No Drawings

METHOD OF PREVENTING INGESTION OF LEAD BASE PAINT COATINGS

CROSS REFERENCE TO RELATED APPLICATION

This application is a continuation-in-part of my co-pending application Ser. No. 220,410, filed Jan. 24, 1972, for "Non-Palatable, Non-Ingestable Coating Compositions", now abandoned which in turn is a continuation-in-part of my application Ser. No. 112,041, filed Feb. 2,1971, entitled "Non-Palatable Coating Compositions," now abandoned.

BACKGROUND OF THE INVENTION

Althrough recent regulations have made it illegal to sell and use lead base paints because of the danger of poisoning of children who eat or suck the chipped paint, there are still many surfaces already painted with lead base paint and the problem of poisoning of children who eat or suck the chipped paint still exists. The ingestion of even a small amount of paint can cause severe illness and larger amounts can cause death. The greatest problem results from the fact that the old lead base paints seem to have a pleasant or sweet taste to children. It is therefore necessary to discourage the ingestion of such painted surfaces.

SUMMARY OF THE INVENTION

Generally speaking, in accordance with the present invention, a solution or an emulsion in water is prepared of sucrose octa-acetate in methylene chloride or in trichlorethylene and the same is applied to a lead-base painted surface and the solvent is permitted to evaporate whereby the sucrose octa-acetate remains bound to the surface and the exceedingly bad taste of the sucrose octa-acetate discourages ingestion of the painted surface, particularly by children and animals.

It is accordingly a primary object of the present invention to provide for the treatment of lead-base painted surfaces so as to render the same non-palatable and discourage ingestion thereof.

It is a further object of the present invention to provide for the treatment of lead-base painted substances in such manner as to cause sucrose octa-acetate to remain bonded to the surface and to thus give the surface such bad taste that ingestion thereof by animals or children or anyone else in fact is discouraged.

Other objects and advantages of the present invention will be apparent from a further reading of the specification and of the appended claims.

With the above and other objects in view, the present invention mainly comprises applying to a lead-base paint coated surface a solution of sucrose octa-acetate in a solvent selected from the group consisting of methylene chloride, trichlorethylene and isopropyl alcohol (which solution may be emulsified in water) and permitting the solvent to evaporate, whereby the solvent slightly dissolves and softens the existing lead-base paint coating so that upon evaporation of the solvent the sucrose octa-acetate remains bound to the surface. The resulting coated surface with the sucrose octa-acetate bound thereto has such bad taste resulting from the sucrose octa-acetate that eating of chips of the surface is discouraged.

Although sucrose octa-acetate has been used in animal deterrent compositions because of its bitter taste, such compositons were always in the form of powders or paste for solution or suspension in water, for example in paint lacquers or the like, whereby the surface to be treated was actually coated or painted with a composition containing the sucrose octa-acetate as one of the animal deterrent components. No provision whatsoever has been made for the application of sucrose octa-acetate to a lead-base painted surface without adverse effect to the appearance of the painted surface while being assured of permanent adherence of the sucrose octa-acetate to the surface so that it can provide its discouraging action against ingestion of the paint.

This can be accomplished only by providing a solvent action for the sucrose octa-acetate with a solvent which will also soften the lead-base painted surface and which will evaporate leaving the sucrose octa-acetate bonded to the painted surface. It is necessary that the solvent being volatile in order that it can evaporate, however the solvent cannot be so volatile that it evaporates too quickly, that is before it has had a chance to soften the paint film and thus cause the sucrose octa-acetate which remains after evaporation of the solvent to be bound to the remaining paint film.

It has been found that this is best achieved by using either methylene chloride or trichlorethylene as the solvent for the sucrose octa-acetate. Fairly good results are also achieved using isopropyl alcohol as the solvent.

The amount of sucrose octa-acetate in the solution should be between about 1 and 20 percent by weight.

Solvent costs can be cut somewhat either by extending the solution with up to 25 percent of mineral spirits of any desired boiling point, though material boiling at a range of from 60° to 300°F. is most desirable, or by emulsifying the solution with water. Any emulsifying agent can be used for this purpose. In preparing an emulsion, the solution to emulsion ratio may be from 1 : 3 to 3 : 1, preferably about 1 : 1.

DESCRIPTION OF PREFERRED EMBODIMENTS

The following Examples are given to further illustrate the present invention. The scope of the invention is not, however, meant to be limited to the specific details of the Examples.

EXAMPLE 1

A solution is prepared of 3 percent sucrose octa-acetate and isopropyl alcohol. The solution is applied to a wall which has previously been painted with a lead-base paint. The solvent evaporates after a few hours and it is found that a thin film of sucrose octa-acetate remains. The film remains partly on the surface and partly in the surface. While the sucrose octa-acetate on the surface may become brushed off, the sucrose octa-acetate in the surface remains over long periods of time and many months or even years after, upon chipping of the paint, the paint is found to have a disagreeably bitter taste.

EXAMPLE 2

A solution is prepared of 1 percent sucrose octa-acetate in trichloroethylene and is applied to a wall which has previously been painted with a lead-base as in Example 1. The effect is the same, and the sucrose octa-acetate remains adhering to the paint over long periods of time, and thus discourages ingestion of chips of paint by children or animals.

EXAMPLE 3

A solution is prepared of 20 percent sucrose octa-acetate in methylene chloride. This solution may be used in the same manner as in the previous examples.

EXAMPLE 4

The solution of Example 3 is mixed with mineral spirits of relatively low boiling point, between about 60° and 100°F. in a ratio of 75 parts of the solution to 25 parts of mineral spirits. The resulting solution may be used in the same manner as in the previous examples.

EXAMPLE 5

An emulsion in water is prepared as follows:
A solution is prepared of:
19.5 percent sucrose octa-acetate
80 percent methylene chloride
0.5 percent Arquad 2HT–75 as emulsifying agent The above composition is stirred vigorously into water in a ration of 1 : 1. The resulting emulsion may be applied to lead-base painted surfaces and upon the evaporation of the water and the methylene chloride, sucrose octa-acetate remains adhering to the surface, thus discouraging ingestion thereof.

While the invention has been illustrated in particular with respect to specific compositions and the use thereof to discourage ingestion, it is apparent that variations and modifications thereof can be made without departing from the spirit or scope of the invention.

What is claimed is:

1. A method of minimizing the danger of ingestion of a lead-base painted coating which coating is harmful when ingested, which comprises applying to a surface coated with a lead-base paint a composition consisting essentially of a solution of sucrose octa-acetate in a solvent selected from the group consisting of methylene chloride, trichlorethylene and isopropyl alcohol, said solution containing a sufficient amount of sucrose octa-acetate to cause the surface to which it is applied to have such bad taste that ingestion of the same is discouraged, whereby said solvent partially dissolves and softens the lead-base paint coated surface and causes said sucrose octa-acetate to adhere to the coated surface and permitting evaporation of the solvent, whereby the sucrose octa-acetate remains adhereing to said surface.

2. Method according to claim 1 wherein said composition is in the form of a pure solution of said sucrose octa-acetate in said solvent.

3. Method according to claim 2 wherein said solvent is methylene chloride.

4. Method according to claim 2 wherein said solvent is trichlorethylene.

5. Method according to claim 2 wherein said solvent is isopropyl alcohol.

6. Method according to claim 1 wherein said sucrose octa-acetate is present in the solution in an amount of between about 1 and 20 percent by weight.

7. Method according to claim 1 wherein said composition consists essentially of said solution and mineral spirits of boiling range of 60° to 300°F., said mineral spirits being present in an amount of up to 25 percent by weight.

8. Method according to claim 1 wherein said solution is emulsified with water in a ratio of 1 : 3 to 3 : 1.

9. Method according to claim 8 wherein said ratio of solution to water is 1 : 1.

* * * * *